United States Patent [19]

Brittain et al.

[11] 4,284,488

[45] Aug. 18, 1981

[54] SACRIFICIAL ANODE ASSEMBLY

[75] Inventors: Robert Brittain, Walsall; Andrew L. Hickman, Wombourne, both of England

[73] Assignee: Global Cathodic Protection, Ltd., Salop, England

[21] Appl. No.: 135,764

[22] Filed: Mar. 31, 1980

[30] Foreign Application Priority Data

Mar. 30, 1979 [GB] United Kingdom ............. 11327/79

[51] Int. Cl.³ ............................................. C23F 13/00
[52] U.S. Cl. .................................................. 204/197
[58] Field of Search ............................... 204/148, 197

[56] References Cited

U.S. PATENT DOCUMENTS

| Re. 27,529 | 12/1972 | Doremus et al. | 204/197 |
|---|---|---|---|
| 3,494,849 | 2/1970 | Hess | 204/197 |
| 3,553,094 | 1/1971 | Scott et al. | 204/197 |
| 3,726,779 | 4/1973 | Morgan | 204/197 |
| 3,803,012 | 4/1974 | Kurr | 204/197 |
| 3,870,615 | 3/1975 | Wilson et al. | 204/197 |
| 3,994,794 | 11/1976 | Bohne | 204/197 |
| 3,994,795 | 11/1976 | Kurr | 204/197 |
| 4,045,320 | 8/1977 | Klingenberg | 204/197 |
| 4,176,033 | 11/1979 | Council | 204/197 |
| 4,190,512 | 2/1980 | Wyatt et al. | 204/197 |

OTHER PUBLICATIONS

"Cathodic Protection of Submarine Pipeline", reprint from Federated Metals Digest, 1958.

Primary Examiner—G. L. Kaplan
Attorney, Agent, or Firm—Cushman, Darby & Cushman

[57] ABSTRACT

A sacrificial anode for use in cathodic protection is made in the form of a bracelet which has two parts, each of the parts has a series of anodes connected between a pair of straps and each of the straps of one of the parts is hingedly connected to a corresponding strap of the other of the parts.

6 Claims, 13 Drawing Figures

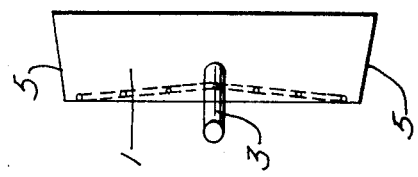
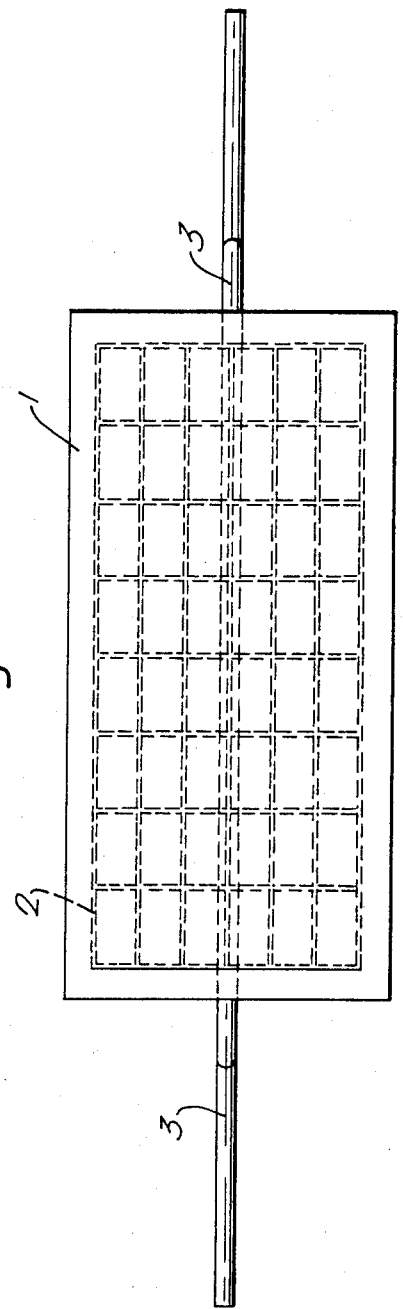
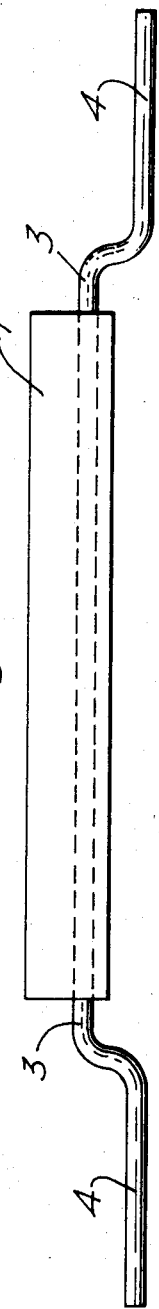

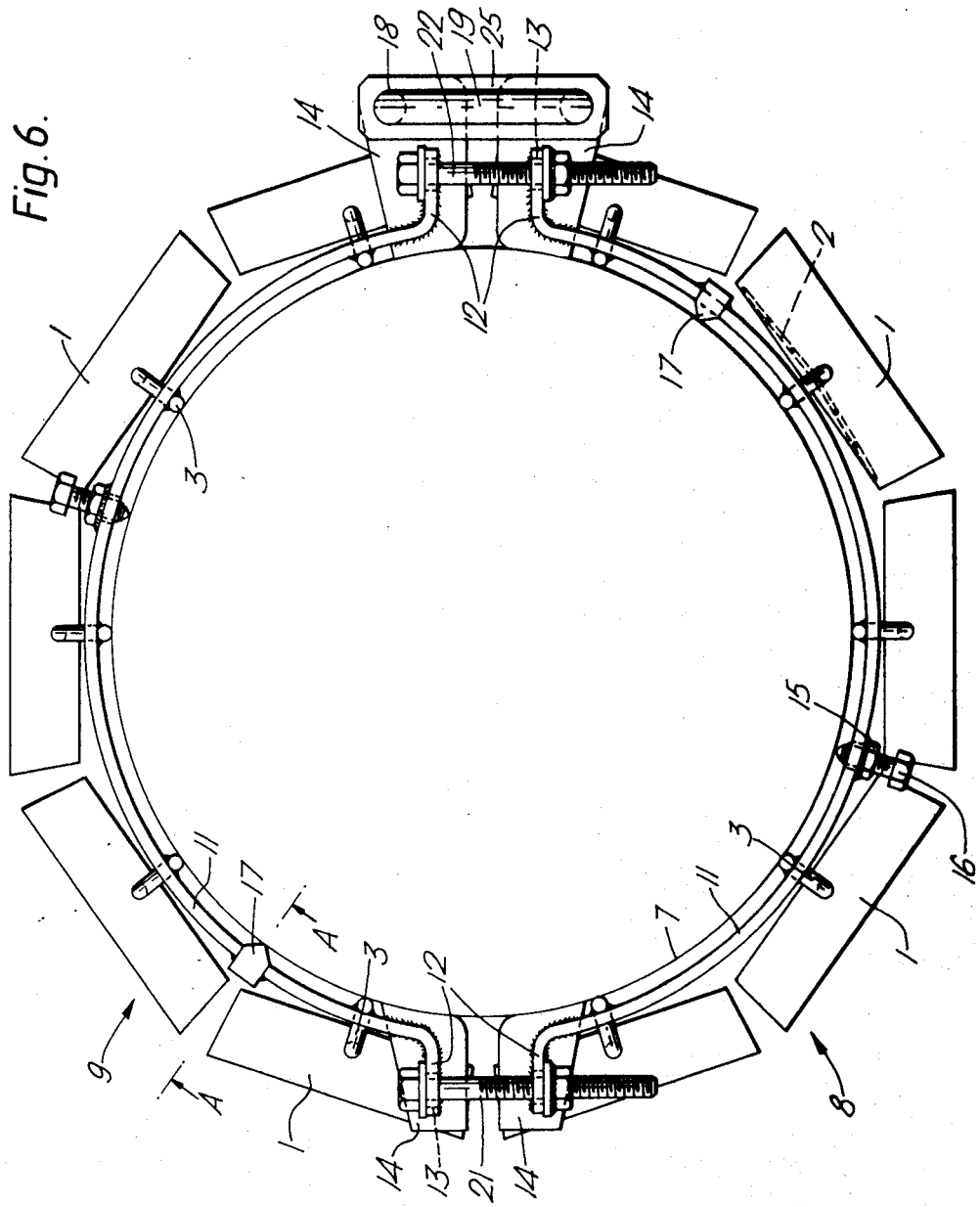

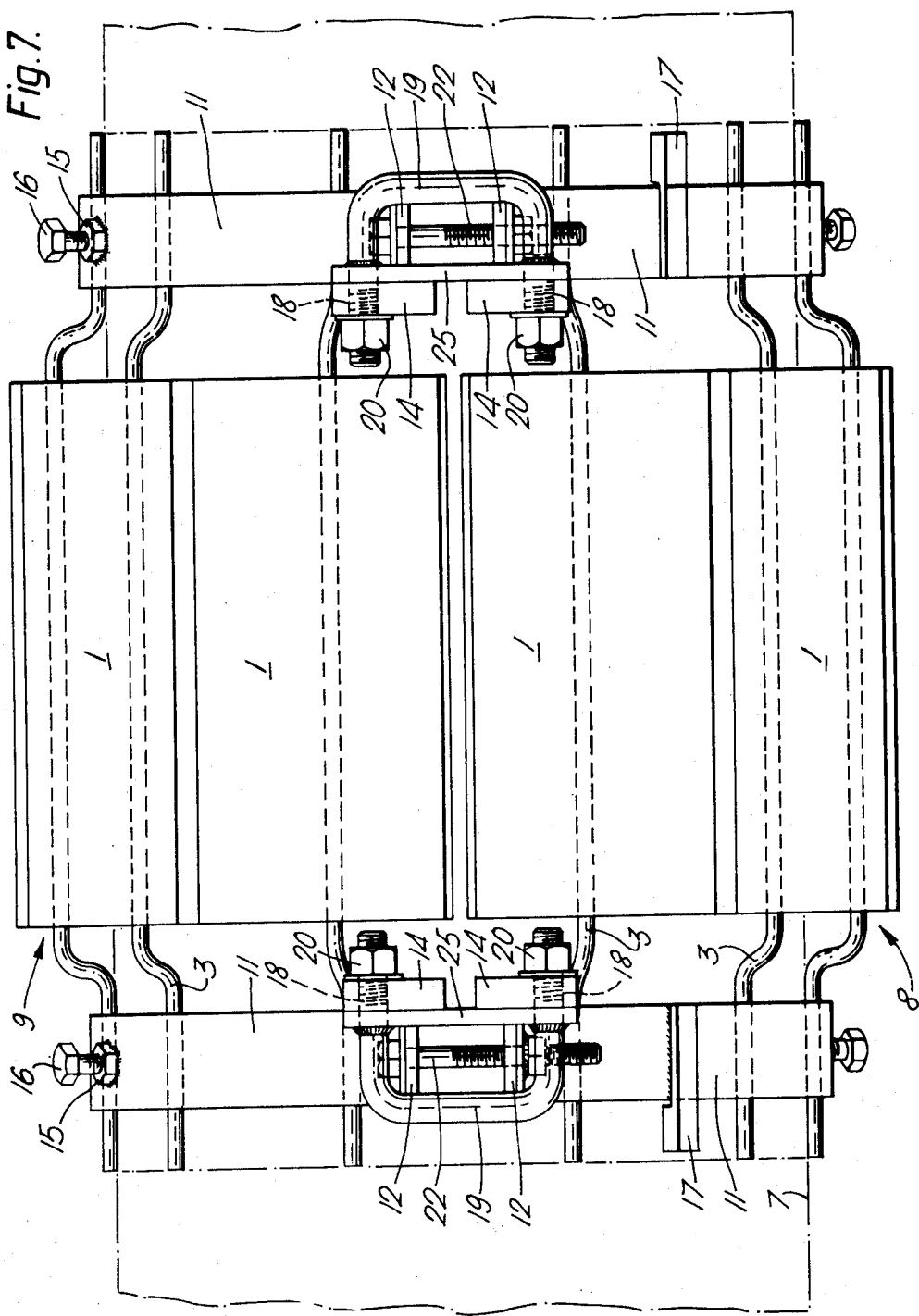

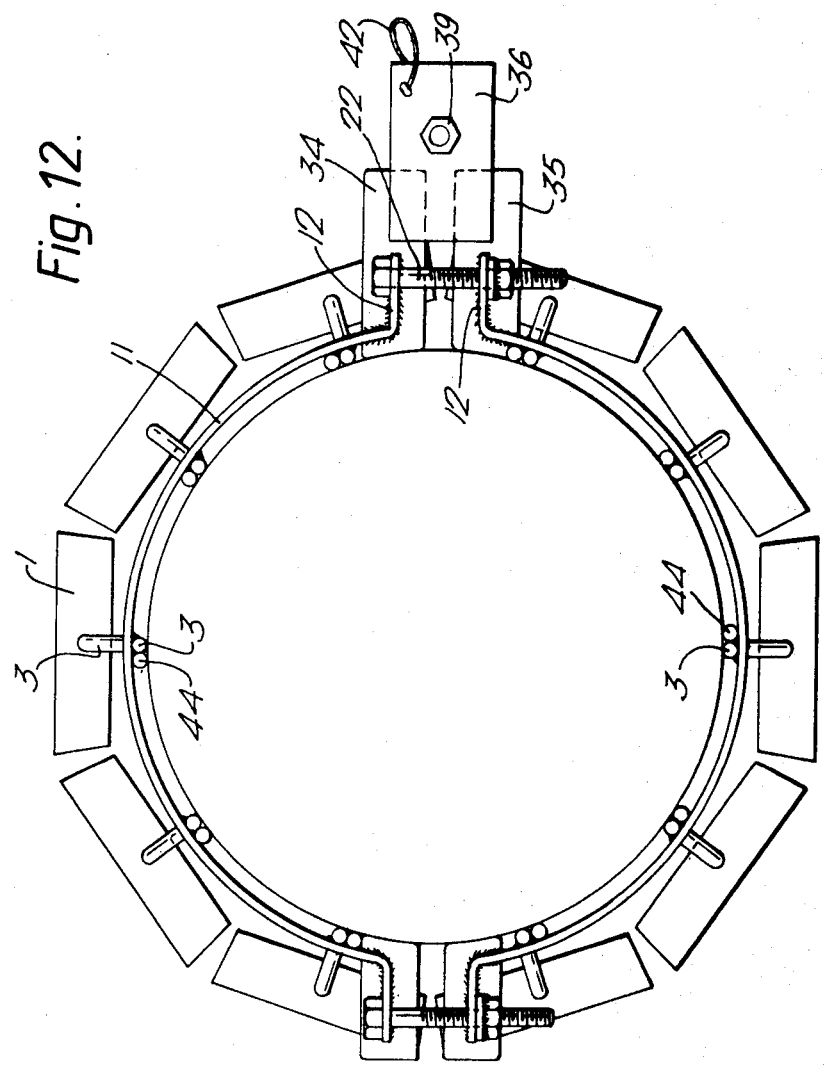

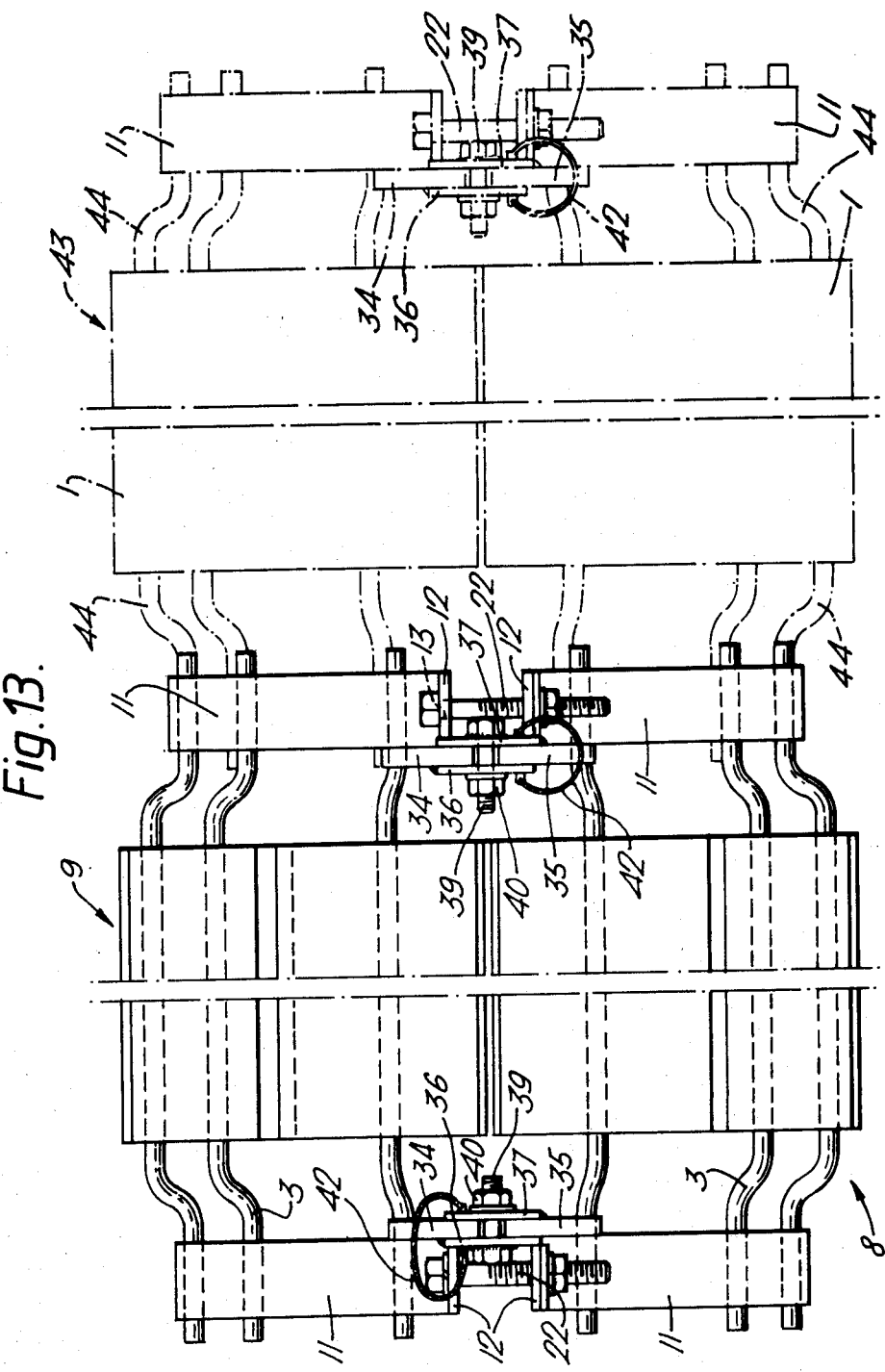

SACRIFICIAL ANODE ASSEMBLY

This invention relates to the cathodic protection of underwater structures, for example drilling platforms and pipe lines.

The use of galvanic anodes for cathodic protection is known and an example of a so-called bracelet anode is described in the specification of U.S. Pat. No. Re. 27,529, reissued on Dec. 12, 1972.

A number of problems arise in the installation and operation of these galvanic anodes and the present invention is concerned with constructions that minimize these problems.

For example, one feature of an embodiment to be described in accordance with the present invention enables a bracelet anode to be fitted to a structure more easily particularly where that structure is already in situ and underwater.

Another feature enables good electrical contact to be provided more easily.

A further feature allows the majority of the bracelet construction to be standing proud of the tubular structure. This avoids deterioration of the anode performance when installed on tubular structures that are carrying hot products, for example, riser pipes on offshore oil producing platforms. In addition this stand off avoids corrosion occurring under the steelwork of the bracelet. Further the stand off reduces the extent of removal of marine growth necessary to facilitate installation of the bracelet on to an existing underwater structure.

Embodiments of the invention will now be described, by way of example, with reference to the accompanying drawings, in which:

FIG. 1 is a plan view of an anode;

FIG. 2 is a side view of the anode shown in FIG. 1;

FIG. 3 is an end view of the anode shown in FIGS. 1 and 2;

FIG. 6 is an end view of a bracelet assembly on a tubular member;

FIG. 7 is a plan view of the assembly shown in FIG. 6;

FIG. 12 is an end view of a further embodiment of a bracelet assembly on a tubular member; and FIG. 13 is a plan view of the assembly shown in FIG. 12.

Figure 4:
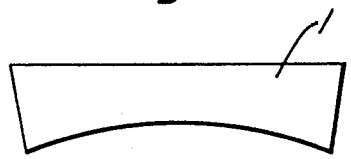
FIGS. 4 and 5 are end views of alternative anode configurations.

Referring to FIGS. 1-3, there is shown a sacrifical anode 1, which is cast, from an alloy material well known for the purpose, about a mild steel mesh grid 2. The grid 2 is welded to the underside of a mild steel round bar 3. The bar 3 extends from the opposite ends of the anode 1 and the extensions are bent in such a way that the end portions 4 are out of line with the anode body 1. It can be seen from FIG. 3 that the main surfaces of the anode 1 are flat and parallel to one another and that the body 1 has side surfaces 5 that taper from a wider upper main surface to a narrower lower main surface.

Figure 5:
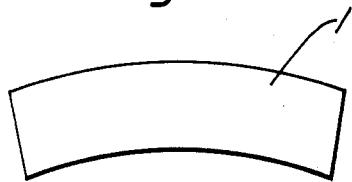

FIGS. 4 and 5 show end views of other possible shapes of anode body 1. In FIG. 4 the lower main surface of the body 1 is curved and in FIG. 5 both the upper and the lower main surfaces of the body 1 are curved.

Figure 8:
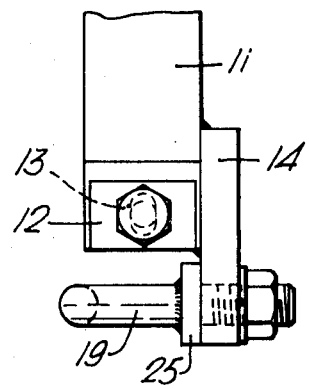
FIG. 8 is a side view of a hinge assembly taken in the direction of arrow B shown on FIG. 7.
Figure 9:
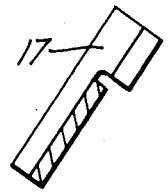
FIG. 9 is a section through a tab taken on the line A—A shown on FIG. 6.

The way in which these anode bodies are assembled to form a bracelet will now be described with reference to FIGS. 6, 7 and 8. The bracelet shown in these Figures has ten anode bodies 1, each with a bar 3 extending from its opposite ends. The bracelet is shown assembled about a tubular member having an outer surface 7. The bracelet is made up of two similar parts 8 and 9, each part having a strap 11 at each end. The ends of the straps 11 are bent to form clamp plates 12. Each of the clamp plates 12 is provided with a hole 13 in the form of an elongated slot. A bracket or hinge plate 14 is welded between the upstanding clamp plate 12 and the main part of the strap 11. Nuts 15 are welded to the straps 11 and bolts 16 are screwed into the nuts 15 to provide electrical connection terminals. Welding tabs 17, as shown in FIG. 9, are welded to the straps 11, in order to enable welded connections to be made more easily to the structure about which the bracelet is arranged.

It will be noted that each of the hinge plates or brackets 14 has a hole 18 and that the two parts 8 and 9 of each bracelet are hinged together on one side by a respective U-bolt 19 each one of whose ends passes through a hole 18 in a respective hinged plate 14, and is held in place by a nut 20.

It will also be noted that bolts 21 and 22 pass through the holes 13 in the clamp plates 12 on opposite sides of the bracelet, respectively.

To position the bracelet on a tubular structure, the bolts 21 and 22 are removed and the two parts 8 and 9 of the bracelet are loosely held together by the U-bolts 19 which act as hinges and allow the parts 8 and 9 to be opened in a jaw-like manner and passed around a structure. It will be appreciated, that by pivotally hinging the parts 8 and 9 in this manner, it is made more easy, particularly in underwater installations, for the bracelet to be positioned about a structure. Furthermore, by having two pivot points on one side of each bracelet, each end of the bracelet can be moved independently and this assists a diver when installing a bracelet under water. The U-hinges can be used as lugs to which rigging lines can be attached and they enable the assembly to be lifted and positioned more easily. Furthermore the rigging lines can remain attached to the assembly throughout the installation of the bracelet. Only when the bolts 21 and 22 have been inserted and securely fastened, holding the two parts 8 and 9 of the assembly firmly together, need the rigging lines be removed. At this time, if desired, the U-bolts 19 can also be removed.

It will be noted that the straps 11, which are used to clamp the bracelet onto the tubular structure, stand proud of the tubular structure by virtue of the fact that the round extension bars 3 from the anode core 1 pass between the straps and the structure to which they are welded. By causing the straps 11 to stand off from the tubular structure in this manner, the risk of corrosion occurring underneath the straps 11 is minimised.

It will be noted, particularly from FIG. 6, that the hinge plates 14 and the clamp plates 12, which are attached to the straps 11, are shaped in such a way that they make contact over an arc of the tubular structure. This shaping enables a high degree of security of the clamping of the assembly on the structure to be obtained and minimises the possibility of distortion of the straps 11 when the bolts 21 and 22 are tightened by transferring the turning moment from the clamp plates to the tubular structure.

It will be seen that the ends of the bars 3 extend beyond the welding tabs 17, which are used to weld the straps 11 to the structure. This arrangement protects the tabs 17 from damage if the anode bracelet assembly is stood on its end. It will be appreciated that the bracelet assembly can be electrically connected to the tubular structure in other ways, for example by welding the ends of the bars 3 to the structure or by welding the hinge or clamp plates to the structure.

It will be noted that in the embodiment described with reference to FIG. 7, there is only one hinge plate 14 welded between the upstanding clamp plate 12 and the main part of the strap 11.

Figure 10:
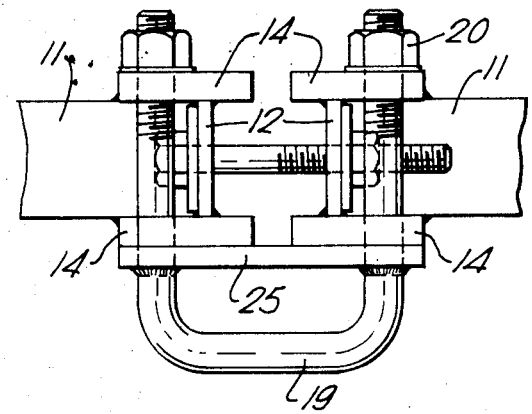
FIG. 10 is a plan view of an alternative hinge arrangement for a bracelet anode.
Figure 11:
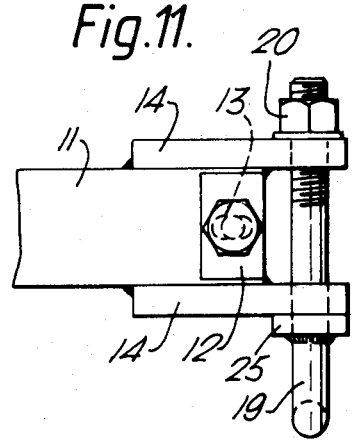
FIG. 11 is a side view of the hinge arrangement shown in FIG. 10.

In the arrangement shown in FIGS. 10 and 11, there are two hinge plates 14, one on each side of the strap 11. In each embodiment the nuts 20 are tightened against a plate 25 which is positioned on the U-bolt.

A further embodiment will now be described with reference to FIGS. 12 and 13, in which similar parts to those already identified will be indicated by the same reference numerals. The embodiment shown in FIGS. 12 and 13 differs from the arrangements described with reference to FIGS. 1–11 in the way in which the bracelet halves are hinged together and in the way in which a second bracelet is connected in tandem with the first bracelet.

The following description of FIGS. 12 and 13 will therefore be largely directed to these features.

In FIGS. 12 and 13, there are shown brackets 34 and 35 on bracelet parts 9 and 8 respectively. The brackets 34 and 35 are welded between the straps 11 and associated clamp plates 12, which have been formed by bending from the straps 11. It will be seen that the brackets 34 are connected to straps 11 of the bracelet part 9 and that the brackets 35 are connected to the straps 11 of the bracelet part 8.

On to each of the brackets 34 there is welded a hinge plate 36 and on to each of the brackets 35 there is welded a hinge plate 37. In each of the hinge plates 36 and 37 there is a hole through which a bolt 39 passes. The bolt 39 also passes through the brackets 34 and 35 so that the hinge plates 36 and 37 can be clamped together, as required, by a nut 40 on the bolt 39.

As in the previously described embodiments, the bolts 21 and 22 pass through the holes 13 in the clamp plates 12 and hold the assembly together after it has been installed.

It will be appreciated that the bolts 39, together with the plates 36 and 37, provide an alternative hinge linkage between the bracelet parts 8 and 9 to that previously described.

Referring particularly to FIG. 12, it can be seen that it is possible to make the fitting of the assembly more positive by extending the edges of the plates 34 and 35, which are shown dotted beneath the plate 36, in such a way that when the bracelet is assembled these edges are in contact. Alternatively, a separate spacer can be inserted between the edges of the plates 34 and 35. The two parts of the bracelet are electrically bonded together by straps 42 connecting respective pairs of plates 36 and 37 together.

The embodiment shown in FIGS. 12 and 13 also illustrates the way in which one or more bracelet assemblies can, if required, be arranged in tandem with a first bracelet. A further bracelet 43 is shown having rods 44 each welded at one of its ends to a strap 11 at one end of each of the bracelet parts 8 and 9.

The rods 44 carry sacrifical anodes 1 in a similar way to the previously described embodiments and they are each welded at their other end to respective straps 11 which are hinged together by means of brackets 34, 35 and plates 36, 37 and a bolt 39 in the way previously described.

Although the invention has been described with reference to particular embodiments, it will be appreciated that variations, modifications and combinations of the arrangements described can be made within the scope of the invention. For example, instead of employing several separate anode bodies on each part of the bracelet 8 and 9 (five anode bodies 1 in the Example shown), it is possible to employ one anode body on each part 8 and 9. Such a body could be cast about a mesh core, similar to that shown at 2 in FIG. 1, which extends over an arc of some 175°. Bars extending from opposite ends of such an anode core could be welded to straps 11 in a way described above and the two bracelet parts could be hingedly coupled together in the manner described above. Furthermore, the bars 3 could be welded to the underside of the straps 11 in the way described so that the straps 11 were spaced from the structure on which the anode body was mounted. It will also be appreciated that although a U-bolt hinge coupling has been described, it would be possible to employ other forms of quick release hinge coupling between the two parts 8 and 9. It would also be possible to couple the parts 8 and 9 together about a structure by any known coupling means.

We claim:

1. A sacrificial anode for use in cathodic protection, the said sacrificial anode having two parts, each of the parts including two mounting straps, an anode body and an electrically conducting member connected between the mounting straps, the anode body being electrically connected to and mechanically mounted upon the electrically conducting member, a hinge member connecting together a strap of one of the parts and a corresponding strap of the other of the parts, the said straps each being pivotally connected to the hinge member at a respective separate pivot point, whereby the said parts can be hingedly opened in a jaw-like manner while being held together in order to enable them to be arranged about a member to be protected, and means to clamp together a strap associated with one of the parts and a corresponding strap associated with the other of the parts.

2. A sacrificial anode as claimed in claim 1 including a mild steel mesh grid welded to the electrically conducting member, the anode body being cast about the mesh grid.

3. A sacrificial anode as claimed in claim 2 including a U-bolt arranged to provide the pivot of the hinge connecting the straps.

4. A sacrificial anode as claimed in claim 2 including a straight bolt arranged to provide the pivot of the hinge connecting the straps.

5. A sacrificial anode as claimed in claim 1 including a round bar constituting the electrically conducting member, each end of the round bar being connected to an inner face of a respective strap, thereby to space the strap from the member to be protected.

6. A sacrificial anode as claimed in claim 1 including a third mounting strap, a second anode body and a second electrically conducting member connected between the third mounting strap and one of the two mounting straps, the second anode body being electrically connected to and mechanically mounted upon the second electrically conducting member.

* * * * *